(12) United States Patent
Weigl et al.

(10) Patent No.: US 7,171,579 B2
(45) Date of Patent: Jan. 30, 2007

(54) METHOD AND DEVICE FOR EXCHANGING DATA BETWEEN AT LEAST TWO STATIONS CONNECTED VIA A BUS SYSTEM

(75) Inventors: Andreas Weigl, Linkenheim-Hochstetten (DE); Thomas Fuehrer, Gerlingen (DE); Bernd Mueller, Leonberg (DE); Florian Hartwich, Reutlingen (DE); Robert Hugel, Karlsruhe (DE); Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 10/169,515

(22) PCT Filed: Dec. 23, 2000

(86) PCT No.: PCT/DE00/04653

§ 371 (c)(1),
(2), (4) Date: Nov. 4, 2002

(87) PCT Pub. No.: WO01/50677

PCT Pub. Date: Jul. 12, 2001

(65) Prior Publication Data

US 2003/0131171 A1 Jul. 10, 2003

(30) Foreign Application Priority Data

Jan. 5, 2000 (DE) ................................. 100 00 302

(51) Int. Cl.
G06F 1/12 (2006.01)
G06F 13/00 (2006.01)
H04H 1/00 (2006.01)

(52) U.S. Cl. ...................... 713/600; 710/100; 370/312

(58) Field of Classification Search ................ 713/600; 710/100, 117, 305, 29; 370/312, 321, 461, 370/462; 726/3
See application file for complete search history.

(56) References Cited

U.S. PATENT DOCUMENTS 5,742,239 A 4/1998 Siloti (Continued)

FOREIGN PATENT DOCUMENTS

DE 196 20 137 11/1997

(Continued)

OTHER PUBLICATIONS

Decotignie et al, Producer-distributor-Consumer Model on Controller Area Network, Nov. 6, 1995, IFAC, XP-002074139, pp. 35-42.*

(Continued)

Primary Examiner—Chun Cao
Assistant Examiner—Suresh K Suryawanshi
(74) Attorney, Agent, or Firm—Kenyon & Kenyon LLP (57) ABSTRACT

A method and a device for exchanging data in messages between at least two stations connected via a bus system, the messages containing the data being transmitted by the stations over the bus system and the messages being controlled over time by a first station in such a manner that the first station repeatedly transmits a reference message over the bus at at least one specifiable time interval and the time interval is divided into time windows of specifiable length, the messages being transmitted in the time windows, a reference message and the subsequent time windows until the next reference message being combined into a first cycle, and the first station interrupting the transmission at the end of a first cycle due to a stop request, in particular, a message of the at least second station.

10 Claims, 5 Drawing Sheets

U.S. PATENT DOCUMENTS

| | | | |
|---|---|---|---|
| 5,819,111 A * | 10/1998 | Davies et al. | 710/29 |
| 6,032,258 A * | 2/2000 | Godoroja et al. | 726/3 |
| 6,111,888 A * | 8/2000 | Green et al. | 370/461 |
| 6,490,293 B1 * | 12/2002 | Barker | 370/462 |
| 6,532,506 B1 * | 3/2003 | Dunstan et al. | 710/100 |

FOREIGN PATENT DOCUMENTS

| | | |
|---|---|---|
| EP | 522607 A1 * | 1/1993 |
| WO | WO 98/54872 | 12/1998 |

OTHER PUBLICATIONS

Decotignie et al, on the Necessary Real-Time Conditions for the Producer-Distributor-Consumer Model, Oct. 4-6, 1995, IEEE, pp. 125-133.*

* cited by examiner

METHOD AND DEVICE FOR EXCHANGING DATA BETWEEN AT LEAST TWO STATIONS CONNECTED VIA A BUS SYSTEM

FIELD OF THE INVENTION

The present invention relates to a method and a device for exchanging data between at least two stations connected via a bus system according to the features of the independent claims.

BACKGROUND INFORMATION

In automotive networking, the CAN protocol has been used for some years. There, communication is event-triggered. Very high loads can be generated when the transmission of different messages is to be initiated at the same time. The non-destructive arbitrating mechanism of CAN guarantees that the sequential transmission of all messages according to the priority of their identifiers. For hard real-time systems, an analysis of the transit times and bus loads has to be done previously for the entire system to ensure that all message deadlines can be met (even during peak load).

There are already communication protocols which work on the basis of time-triggered processing, such as TTP/C or Interbus-S. In these protocols the bus access is scheduled already in advance by assigning transmission points. Therefore, no collisions can occur during transit time. However, a peak load on the communication bus is avoided as well. Thus, the bus is frequently not completely utilized to capacity in the process.

Time-determined communication systems permit a predeterminable execution of the processes. Therefore, it is possible for the application to be synchronized with the communication in a narrower time range than in an arbitrating system. In the case of a communication which is performed purely cyclically, however, the application is rigidly bound to the time pattern whereas certain operational sequences, in particular, the engine control in a vehicle, require a time-variable transmission of messages or data, in particular, of the measured values, which is adapted to the rotational speed.

These methods and configurations cannot provide optimum results in every respect.

SUMMARY

The present invention includes a method and a device for exchanging data in messages between at least two stations connected via a bus system, the messages containing the data being transmitted by the stations over the bus system and the messages being controlled over time by a first station in such a manner that the first station repeatedly transmits a reference message over the bus at at least one specifiable time interval and the time interval is divided into time windows of specifiable length, the messages being transmitted in the time windows, a reference message and the subsequent time windows until the next reference message being combined into a first cycle, and the first station interrupting the transmission at the end of a first cycle by a stop request, in particular, a message of the at least second station.

In this context, the CAN bus may be used as underlying bus system or bus protocol. However, the present invention generally relates to any bus system or bus protocol in which an object-oriented transmission of messages or data is used, that is, the message and/or the data contained therein are clearly recognizable by an identifier. This is true for all busses, in particular, for the CAN bus, where not the stations are addressed but the messages or the data thereof.

In comparison with other protocols, therefore, the present invention includes a higher protocol layer in addition to the actual bus(CAN) protocol which remains unchanged within the scope of the time-triggered communication. Thus, the time-triggered communication allows utilization of the bus to capacity and, at the same time, maintains the latencies at a defined value for each message.

The present invention therefore includes a transmission of bus(CAN) messages which is performed cyclically. In this manner, a deterministic and composable communication system is produced. A system of this kind will hereinafter be referred to as TTCAN. Also, a CAN bus will be assumed hereinafter, the considerations generally applying to all bus systems or bus protocols with object-oriented transmission of messages as indicated above.

The reference message and the subsequent time windows until the next reference message may be combined into a first cycle of specifiable length and/or structure, the structure corresponding to the length, number and temporal position of the time windows following the reference message in the time interval.

Moreover, a plurality of first cycles having the same structure may be combined into a second cycle in which messages are also repeatedly transmitted in time windows whose time interval is greater than the time length of the first cycle.

In at least one time window of the first or of the second cycle, a cyclic message transmission may be omitted. It is then possible to transmit arbitrating messages in these initially empty time windows, that is, messages which need not be transmitted cyclically but have to be available, e.g., when certain processes are completed.

The first station may initiate a first cycle upon a start request, e.g., by the second station.

Moreover, the stop request and/or the start request may be effected by a device which is external with regard to the bus system and which is connected to the first station for this purpose.

In an exemplary embodiment, the at least second station or the external device is used for the application.

In this manner, a time-determined communication sequence is matched with external events of the application. By way of example, reference is made here to the angle synchronous processing of the measured values in the engine control system which are acquired via a time-triggered communications system.

Time-determined communication systems permit a predeterminable execution of the processes. Therefore, it is possible for the application to be synchronized with the communication in a narrower time range than in an arbitrating system. In the case of a communication which is performed purely cyclically, however, the application is rigidly bound to the time pattern. In the exemplary embodiment of an engine control system, however, it may be necessary for the transmissions of measured values to be adapted to the speed variation dynamics. This may be achieved in that the cyclic communication sequence is able to be interrupted and to be restarted in a defined manner in response to an external event.

An advantage may be the fast detection of failed stations or nodes (the application expects messages in a fixed temporal relation to the event).

DETAILED DESCRIPTION

TTCAN is essentially based on a time-triggered, periodic communication which is clocked by a time master (node, station) with the aid of a time reference message, or in shorter terms, reference message RN. The period until the next reference message RN is referred to as basic cycle and divided into n time windows (see FIG. 2). Each time window allows exclusive transmission of a periodic message of different length. These periodic messages are transmitted in a TTCAN controller by using time marks which are linked to the expiration of a logically relevant time. However, TTCAN makes it also possible for free time windows to be taken into account. These time windows may be used for so-called "spontaneous" messages, the access to the bus being used via the arbitration schema of CAN within these time windows (arbitrating messages). The synchronization of the time master clock (global time gZ) with the internal local time of the individual nodes 1Z1 through 1Z4 is taken into account and efficiently implemented.

Figure 1:
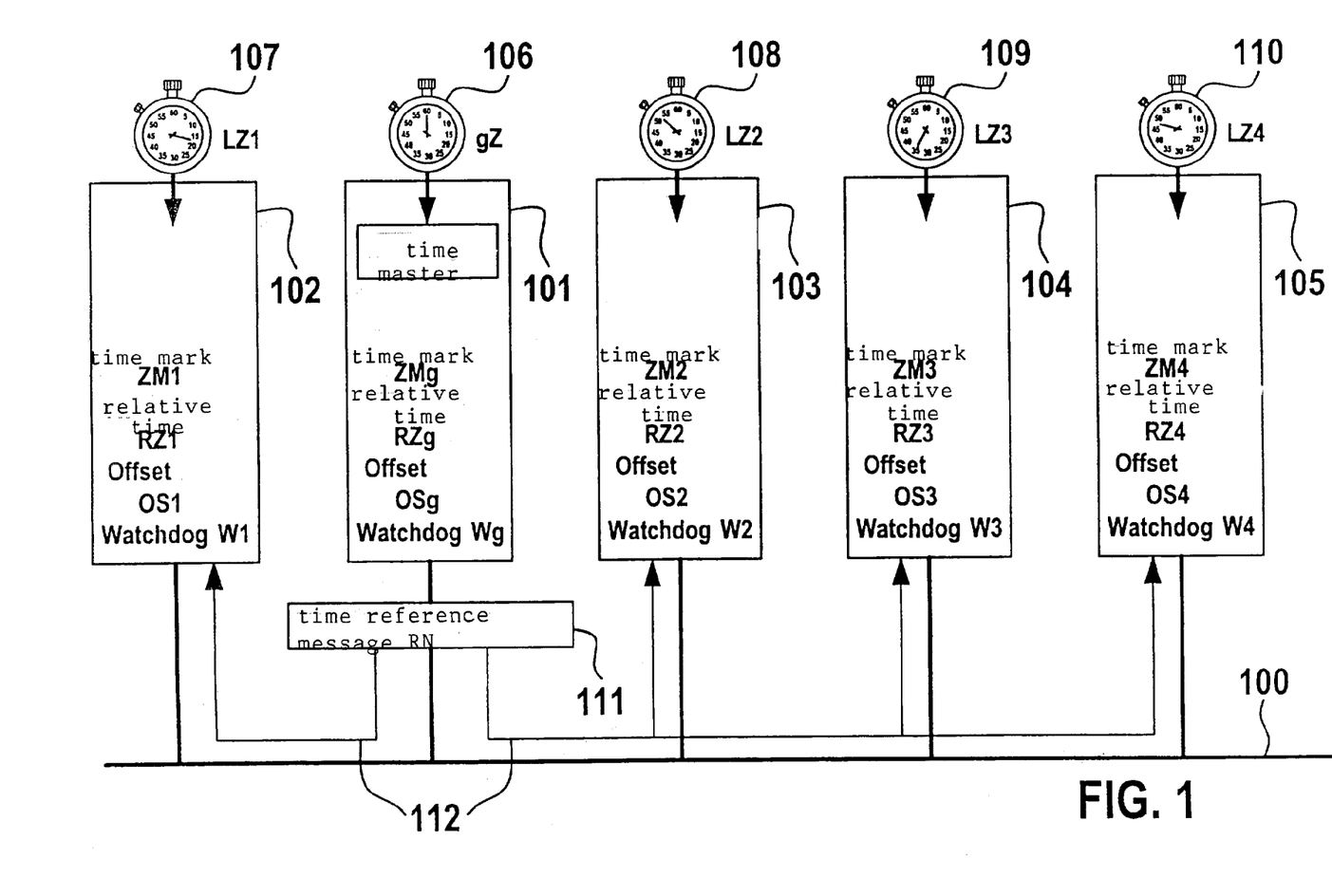
FIG. 1 is a schematic view of a bus system including several stations.

FIG. 1 illustrates a bus system 100 including several stations 101 through 105. Each station 101 through 105 has an individual time base 106 through 110 which may be transmitted to the respective station, by an internal arrangement such as, e.g., a clock, counter, or clock generator, etc., or externally. The respective local time base 1Z1 through 1Z4 is, in particular, a counter which is incremented, e.g., in 16 bits, and which may only be influenced by a HW reset. Here, the local time base is implemented in each node or station 102 through 105. One station, the time master, 101 has an exposed position. The time base is denoted by global time gZ as the global time base 106 and is either implemented in time master 101 or externally transmitted thereto. Global time gZ is generated in each node from local time base 107 to 110 or local time 1Z (1Z1 to 1Z4) and an offset OS1 to OS4. This offset Osg at time master 101 is equal to zero (Osg=0). All other nodes generate their view of the global time gZ from local time 1Z (1Z1 to 1Z4) and local offset OS1 to OS4 and OSg if OSg=0. OSg is unequal to zero when, e.g., global time gZ is transmitted to time master 101 from outside and this time master additionally contains a time base 106 of its own. Then, the time master is also calibrated to global time gZ, and gZ and time base 106 possibly do not match each other. The local offset is the difference between the local time at the point of transmission (SOF, start of frame) of the reference message and the global time transmitted by the time master in this reference message.

Local time base and global time

Local time base: The local time base is a counter which is incremented, e.g., in 16 bit increments, and which may only be influenced by a HW reset. The local time base is implemented in each node.

Reference mark intermediate resister: Each time an SOF is accepted, the local time base is loaded into the intermediate register.

Reference marker: If the current message is recognized as a reference message, then the value is captured from the intermediate register into the reference marker (as a local reference mark). The reference marker is configured, e.g., as a 16-bit register.

Time master reference mark: This is the reference mark of the time master received by the time slaves in the reference message.

Local offset to the global time: The local offset to the global time is the difference between the reference mark in the intermediate register and the global time mark received in the reference message. It is used to calculate the global time from the local time. The offset of the time master itself remains constant. In the reference message, the time master transmits a local reference mark plus the local offset.

Time master 101 is also the node or station which transmits time reference message 111 or in shorter terms, reference message RN. Arrow 112 indicates that reference message RN 111 is transmitted to the other stations 102 through 105, in particular, at the same time.

Reference message RN is the basis for the time-triggered, periodic operation of TTCAN. It is identified by a special identifier and received by all nodes, here 102 through 105, as a master clock. It is sent cyclically by the time master 101. The reference message may contain the following data: number of the current basic cycle BZn, the reference mark of the time master in global time.

The reference mark is generated by capturing the internal counter content at the point of the start of frame (SOF) bit when the reference message of the time master is received. Thus, the reference mark is a snapshot of the local time base at the point of reception of the reference message. Relative time RZ1 through RZ4 and RZg indicated in the stations is the difference between the local time base and the last reference mark. All definitions regarding the used time marks refer to the relative time of a single station. It may be present, e.g., permanently as a signal (e.g., by gating the two register values). The reference mark determines the relative time of all nodes on the TTCAN bus.

Watchdog Wg and W1 through W4, which is also illustrated, is a special relative point in time. In each node, such a relative point in time (watchdog) is defined at which a new reference message and thus also a reference mark are expected at the latest. The watchdog represents a special time mark. The watchdog is primarily used during initialization and reinitialization to monitor whether a communication has occurred at all. When a communication has occurred, the watchdog may always be larger than the interval between the reference messages.

A time mark is a relative point in time which establishes the relation between the relative time and an action in the original bus(CAN) controller. A time mark is represented as a register, a controller being able to administer several time marks. A message may be assigned several time marks (see, e.g., FIG. 4: transmission group A occurs both in time window ZF1a and in time window ZF4a).

With regard to the application, in particular, an application watchdog is serviced. This watchdog has to be regularly serviced by the application to signal proper operation to the TTCAN controller. The messages are transmitted by the CAN controller only if this watchdog is serviced.

Figure 2:
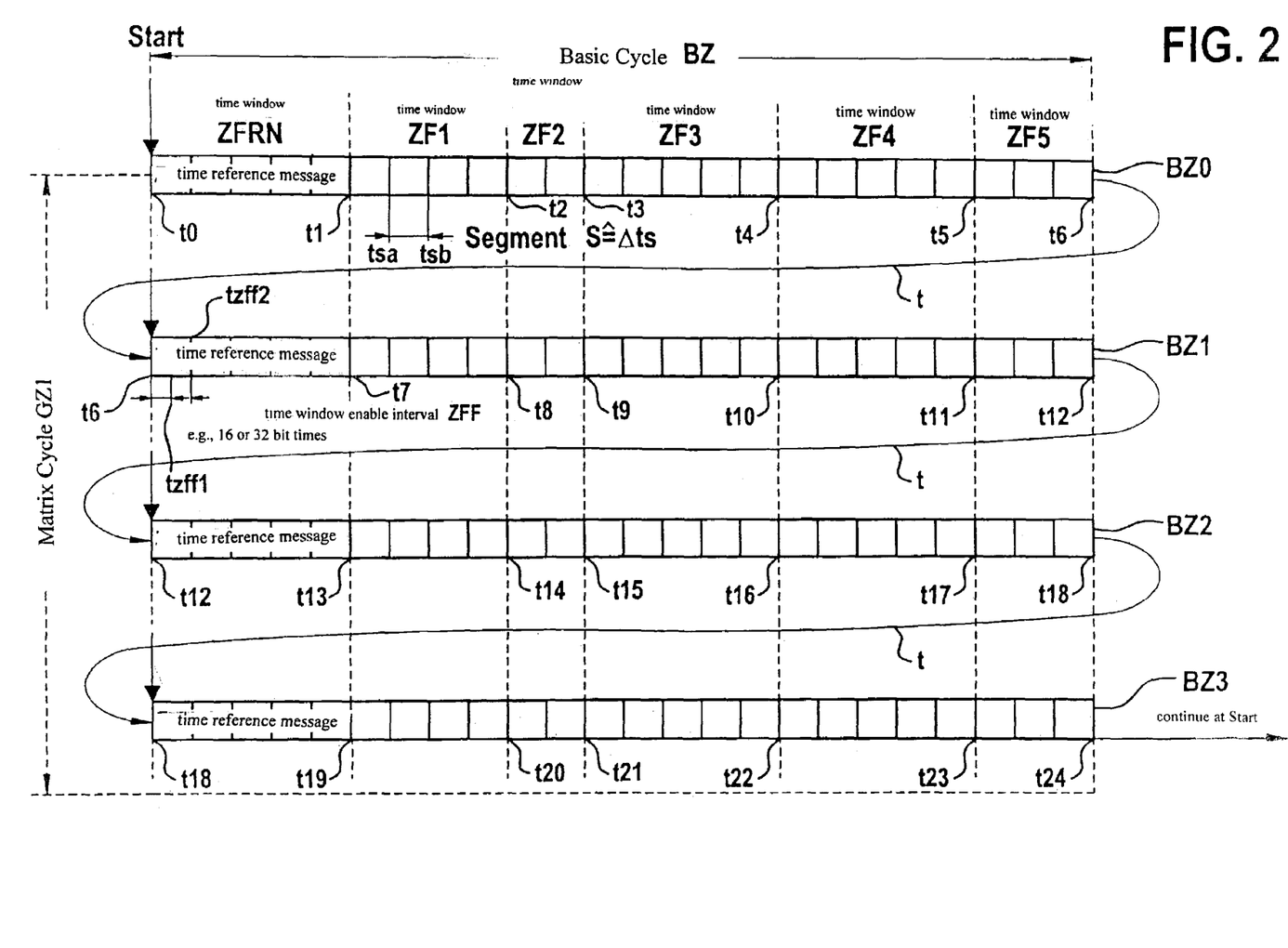
FIG. 2 is a time scale representation of the basic sequence of the first cycles or basic cycles and of the second cycles, the matrix cycles.

FIG. 2 illustrates the principle of the time-triggered, periodic transmission of messages or data over time. This message transmission is clocked by the time master with the aid of the reference message. The interval t0 through t6 is referred to as basic cycle BZ and divided into k time windows (k∈N). In this connection, the reference messages RN of the respective basic cycles BZ0 to BZ3 are transmitted from t0 to t1, t6 to t7, t12 to t13 and t18 to t19, that is in time window ZFRN. The structure of time windows ZF1 through ZF5 following a reference message RN, i.e., their length (in segments S with Δts=tsb−tsa), their number and their temporal position, is selectable. Because of this, it is possible to form a matrix cycle GZ1 from several basic cycles of identical structure, the matrix cycle beginning at T0 and ending at t24 and then being run again. The time windows include, e.g., 2 to 5 segments having, e.g., 32 bit times each. The number of time windows is, e.g., 2 to 16, but just one time window or more than 16 would be possible as well. The number of basic cycles in a matrix cycle is, e.g., $2^m$, where, in particular, m≦4.

Tzff1 and tzff2 exemplarily mark two transmission enable intervals or time window enable intervals which have a duration of, e.g., 16 or 32 bit times and describe the time frame within which the transmission of the message may be started with respect to the basic cycle.

Figure 3:
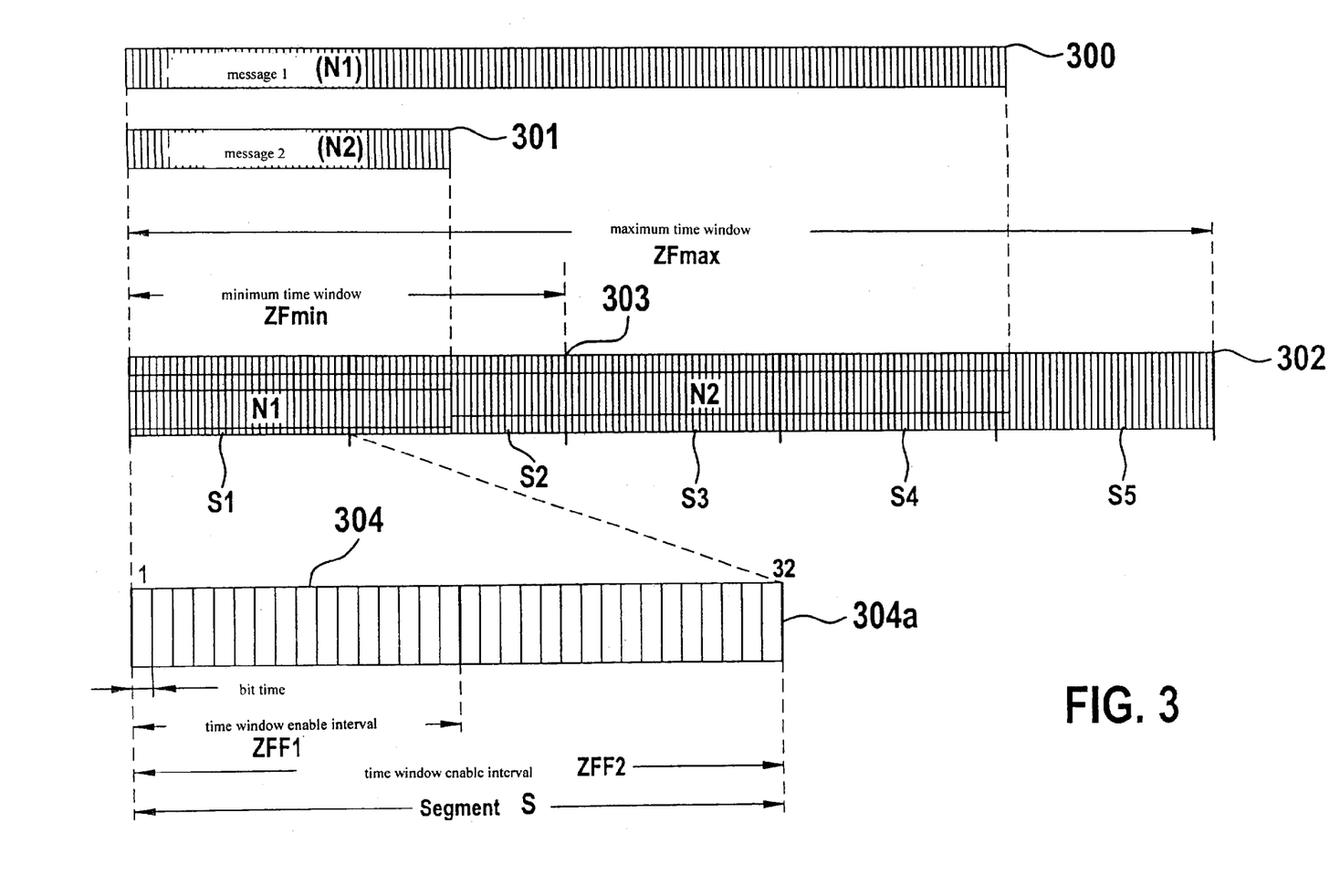
FIG. 3 is a detail view of the structure and message allocation of the time windows.

Each time window allows exclusive transmission of a periodic message of different length. FIG. 3 illustrates, by way of example, two messages of different length as well as the allocation in the time window. Message 1 (N1), as a block 300, contains, e.g., 130 bits, and message 2 (N2), as a block 301, contains, e.g., 47 bits.

As previously mentioned, it is possible to specify maximum and minimum time windows as a function of the message length, in this example here, for instance, between 2 and 5 segments per time window. Thus, a maximum time window ZFmax is specified as a block 302 containing 5 segments (S1 through S5) with 32 bit times each, and a minimum time window ZFmin is specified as a block 303 containing 2 segments (S1 and S2) with 32 bit times each. Messages N1 and N2 are transmitted in these, in fact, without the need for the messages to completely fill the time windows; rather, the sizes of the time windows are selected according to the message length. Consequently, ZFmax has to offer sufficient time or space for the longest possible message, e.g., 130 bits or bit times; and ZFmin may be adapted to the shortest possible message, e.g., 47 bits.

In general, the time window is the time frame which is available for a particular message (see FIG. 3). The time window of a message is opened when the transmission enable is present, and the beginning of this window always corresponds to a defined time mark. The length of the time window is determined from i segments of, e.g., 32 bit times (cf. block 304a). In this context, the segmentation into, in particular, 32 bit times represents a HW friendly size. The time window must not be shorter than the longest message occurring in this time window. The bit time is, in particular, the nominal CAN bit time.

The transmission enable interval or time window enable interval describes the time frame within which the transmission of the message may be started. The transmission enable interval forms part of the time window. Thus, the enable is present in the interval time mark and time mark plus delta. The value delta is markedly smaller than the length of the time window (e.g., 16 or 32 bit times for ZFF1 or ZFF2). A message whose beginning does not lie within the transmission enable interval may not be transmitted.

Figure 4:
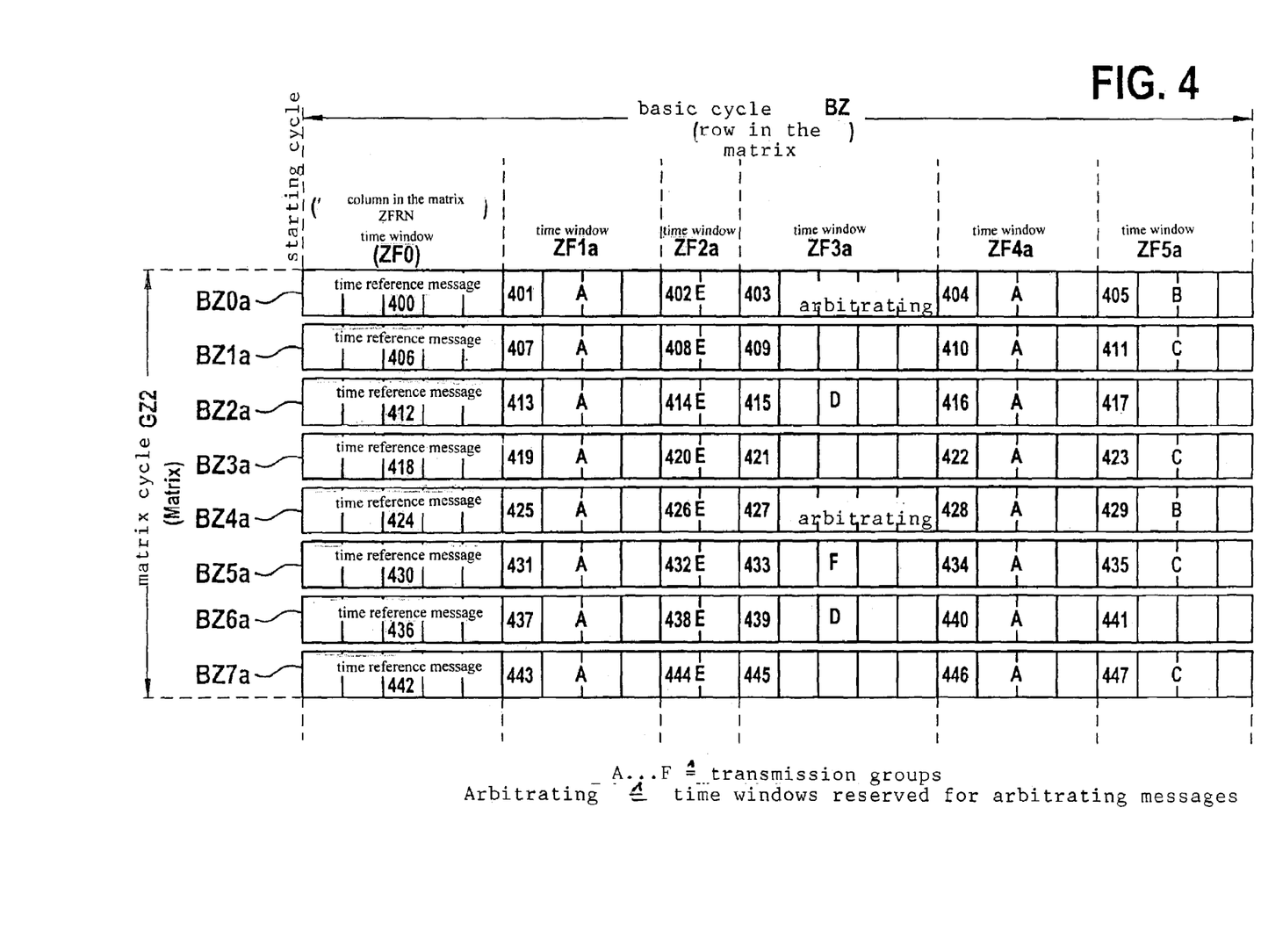
FIG. 4 illustrates a matrix cycle including 7 basic cycles and diverse transmission groups of the messages as well as arbitrating messages.

FIG. 4 illustrates a matrix cycle (transmission matrix) GZ2. Matrix cycle (transmission matrix): All messages (RN, A through F and arbitrating) of all stations are organized as components of a transmission matrix (see FIG. 4). The transmission matrix is constituted by individual basic cycles BZ0a through BZ7a. All basic cycles of matrix cycle GZ2 have the same structure. The basic cycles may optionally be composed of exclusive (A through F) and arbitrating components. Here, the total number of rows (that is, basic cycles BZ0a through BZ7a) is a number $2^m=8$ where m=3.

A basic cycle (row of the transmission matrix) begins with a reference mark in the reference message RN and is composed of a plurality (i) of successive time windows having a defined length (first time window ZF0 or ZFRN for RN). The arrangement of the messages within the basic cycle may be freely determined. For exclusive components, a time window is linked to a CAN message object. However, it is also possible for a time window to be left free (409, 421,441,417,445) or to be used for arbitrating components (403, 427).

A transmission group (column of the transmission matrix, A through F) is formed by messages which are always transmitted in the same time window but in different basic cycles (see FIG. 4). In this manner, it is possible to build a period, e.g., A in ZF1a and ZF4a: 401,407,413,419,425,431, 437,443 and 404,410,416,422,428,434,440,446. Within a transmission group, a message object (of a time window) may be transmitted repeatedly. The period of a message within a transmission group may be a number $2^l$, where 1<=m.

The message object or the message corresponds to the message object of the bus, in particular, in CAN, and includes the identifier and the data itself. In TTCAN, the message object is supplemented with at least one, e.g., with all three of the following entries in the transmission matrix: time window, base mark, repetition rate.

The time window is the position (ZF0, ZF1a to ZF5a) in the basic cycle (BZn, row of the transmission matrix). The beginning of the time window is defined by the reaching of a specific time mark.

The base mark specifies in which basic cycle (BZ0a to BZ7a) in the matrix cycle the message is transmitted for the first time.

The repetition rate specifies the number of basic cycles after which this transmission is repeated.

To mark the validity of a message object for the CAN controller, there is a "permanent transmission request", which means that the object is permanently enabled (for exclusive components, see below), and a "single transmission request", meaning that the object is valid once (for arbitrating components, see below).

Automatic retransmission from CAN may be disabled for the messages in TTCAN. In the following, the message transmission, periodic messages and spontaneous messages in the basic cycle and in the matrix cycle, respectively, will be described again, in particular, with regard to the application. In this context, exclusive messages, that is, periodic messages, and arbitrating, that is, spontaneous messages will be distinguished again.

Exclusive message objects (periodic messages):

Exclusive message objects are transmitted when the application watchdog is set, the "permanent transmission request" of the application to the CAN controller is set, and the transmission enable interval of the associated time window is open. In this instance, the time mark for the message object corresponds to the relative time. The permanent transmission request remains set until reset by the application itself.

Arbitrating message objects (spontaneous messages):

Arbitrating message objects are transmitted when the application watchdog is set, the "single transmission request" of the application to the CAN controller is set, and the transmission enable interval of the next time window intended for this is open. Then, the time mark for this time window is identical to the relative time. Upon successful transmission, the transmission request is reset by the CAN controller. The concurrent access of different spontaneous messages is controlled by the bit arbitration of CAN. If a spontaneous message loses against another spontaneous message in this time window, then it may compete for the bus access only in the next time window intended for this.

If the entire transmission matrix or the matrix cycle is executed, then a cyclic, time-triggered message transmission ensues. Time-triggered means that each action starts when a specific point in time is reached (see time marks and relative time). When the matrix cycle has been run to completion, i.e. all basic cycles have been processed once, then begins with the first basic cycle of the transmission matrix again. No time gaps develop during the transition. An overview of such a time-triggered communication system with time master has been illustrated in the specification and the Figures of the drawing.

Figure 5:
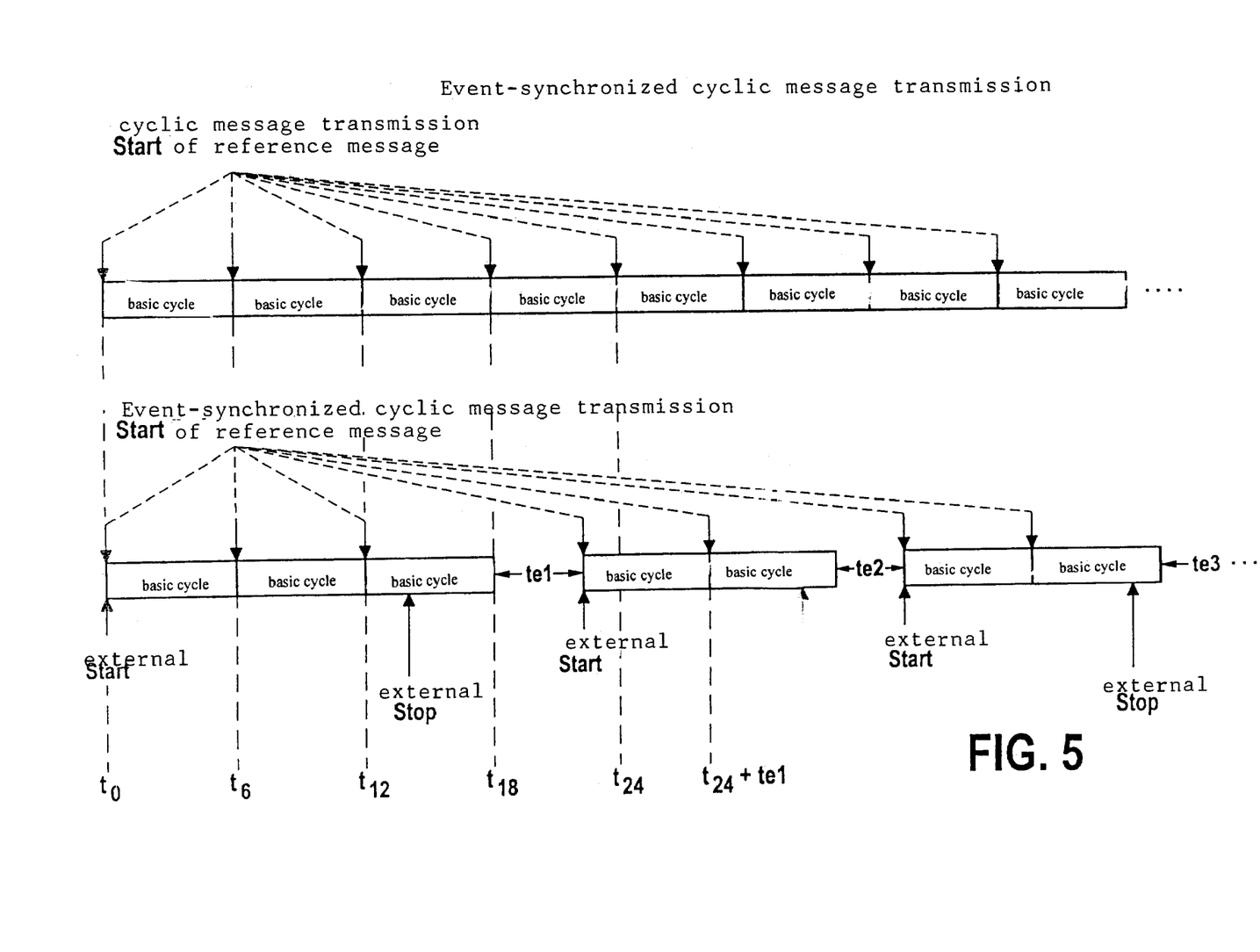
FIG. 5 is a contrast diagram contrasting a cyclic message transmission according to FIGS. 2 and 4 with event-synchronized cyclical message transmission.

FIG. 5 contrasts a cyclic message transmission according to FIGS. 2 and 4 with the event-synchronized cyclical message transmission. In this exemplary embodiment, the starting points of a basic cycle are denoted by t0, t6, t12, t18, t24 and t24+te1, respectively te1, te2 and te3 represent the interrupt times due to event synchronization. In this exemplary embodiment, terms time reference message and reference message are synonymous.

A time-determined communication sequence is to be matched with external events of the application. An example is the angle synchronous processing of the measured values in the engine control system which are acquired via a time-triggered communications system.

Time-determined communication systems permit a predeterminable execution of the processes. Therefore, it is possible for the application to be synchronized with the communication in a narrower time range than in an arbitrating system. In the case of a communication which is performed purely cyclically, however, the application is rigidly bound to the time pattern. In the exemplary embodiment of an engine control, however, it may be necessary for the transmissions of measured values to be time-variable and adapted to the speed variation dynamics. This may be achieved in that the cyclic communication sequence is able to be interrupted and to be restarted in a defined manner in response to an external event.

A communications (TTCAN) controller, which is time master, is enabled to interrupt the cyclic communication at the end of a basic cycle in response to a request, in particular, of the application, and to resume the communication with a new basic cycle upon receipt of a start signal or start request of the application. Depending on whether the interrupt request or stop request is maintained or has been canceled, only one basic cycle is executed or the cyclic communication is continued until a new interrupt request comes in. Regardless of the point in time within a basic cycle at which the request comes in, this cycle will be completed. If the interrupt request is followed by a start signal within the same basic cycle, then the communication will not be interrupted.

For a clear association of external event and communication, the interval between two external events may be larger than or equal to the length of a basic cycle or a basic cycle smaller than the minimum external synchronization interval.

The monitoring by a watchdog which waits for the reference message may be matched to the maximum length of the gap between the basic cycles.

What is claimed is:

1. A method for exchanging data in messages between at least two stations connected via a bus system, comprising the steps of:
   transmitting the messages containing the data by the stations over the bus system;
   controlling the messages over time by a first station so that the first station repeatedly transmits a reference message over the bus system at at least one specifiable time interval, the reference message including a time information of the first station, the time interval divided into time windows of specifiable length, the messages transmitted in the time windows;
   combining into a first cycle a reference message and subsequent time windows until a next reference message; and
   wherein the transmission is at least one of interrupted and restarted by an external request;
   wherein a reference mark is generated when the reference message is received, the reference mark being generated based on the time information of the first station contained in the reference message, and wherein the reference mark is a local time snapshot of a local time base at a receiving station.

2. The method according to claim 1, further comprising the step of initiating the first cycle by the first station in accordance with a start request.

3. The method according to claim 1, wherein the reference message and the subsequent time windows until the next reference message are combined in the combining step into the first cycle of at least one of specifiable length and specifiable structure, the structure corresponding to a length, a number and a temporal position of the time windows following the reference message in the time interval.

4. The method according to claim 1, further comprising the step of combining a plurality of first cycles having a same structure into a second cycle in which messages are repeatedly transmitted in time windows with a time interval greater than a time length of the first cycle.

5. The method according to claim 1, wherein the transmission is interrupted by the first station at end of the first cycle in accordance with a stop request.

6. The method according to claim 1, wherein the method is performed by a second station.

7. The method according to claim 1, wherein the external request is issued by a device external to the bus system and connected to the first station.

8. The method according to claim 1, further comprising the steps of:
   omitting a cyclic message transmission in at least one time window of one of the first cycle and a second cycle; and
   transmitting arbitrating messages in the at least one time window.

9. A device for exchanging data, comprising:
   a bus system; and
   at least two stations configured to exchange the data in messages between the at least two stations connected via the bus system, the stations configured to transmit the messages containing the data over the bus system, a first station configured to control the messages over time and to repeatedly transmit a reference message over the bus system at at least one specifiable time interval, the reference message including a time information of the first station, the time interval divided into time windows of specifiable length, the messages transmitted in the time windows, the reference message and the subsequent time windows combined into a first cycle until the next reference message, wherein the transmission is at least one of interrupted and restarted by an external request, and wherein a reference mark is generated when the reference message is received, the reference mark being generated based on the time information of the first station contained in the reference message, and wherein the reference mark is a local time snapshot of a local time base at a receiving station.

10. A bus system, comprising:

an arrangement configured to perform a method for exchanging data in messages between at least two stations connected via the bus system, the method including the steps of:

transmitting the messages containing the data by the stations over the bus system;

controlling the messages over time by a first station so that the first station repeatedly transmits a reference message over the bus system at at least one specifiable time interval, the reference message including a time information of the first station, the time interval divided into time windows of specifiable length, the messages transmitted in the time windows;

combining into a first cycle a reference message and subsequent time windows until a next reference message; and wherein the transmission is at least one of interrupted and restarted by an external request;

wherein a reference mark is generated when the reference message is received, the reference mark being generated based on the time information of the first station contained in the reference message, and wherein the reference mark is a local time snapshot of a local time base at a receiving station.

* * * * *